(12) United States Patent
Kim et al.

(10) Patent No.: US 9,739,933 B2
(45) Date of Patent: Aug. 22, 2017

(54) BACKLIGHT UNIT COMPRISING FIRST AND SECOND SHOCK-ABSORBING MEMBERS

(71) Applicant: LG INNOTEK CO., LTD., Seoul (KR)

(72) Inventors: Bang Gun Kim, Seoul (KR); Jung Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 165 days.

(21) Appl. No.: 14/455,462

(22) Filed: Aug. 8, 2014

(65) Prior Publication Data

US 2014/0347881 A1 Nov. 27, 2014

Related U.S. Application Data

(62) Division of application No. 13/114,800, filed on May 24, 2011, now abandoned.

(30) Foreign Application Priority Data

May 25, 2010 (KR) ........................ 10-2010-0048498

(51) Int. Cl.
*F21V 8/00* (2006.01)
*G02F 1/1335* (2006.01)

(52) U.S. Cl.
CPC ......... *G02B 6/0093* (2013.01); *G02B 6/0033* (2013.01); *G02B 6/0088* (2013.01); *G02F 1/133615* (2013.01); *G02F 2201/503* (2013.01)

(58) Field of Classification Search
CPC ....................... G02B 6/0033; G02F 2201/503
See application file for complete search history.

(56) References Cited

U.S. PATENT DOCUMENTS

| | | | |
|---|---|---|---|
| 5,583,681 A | * | 12/1996 | Shioya .............. G02F 1/133308 349/161 |
| 6,583,556 B2 | | 6/2003 | Oishi et al. |
| 6,942,353 B2 | | 9/2005 | Yamada et al. |
| 7,911,559 B2 | | 3/2011 | Ohta et al. |
| 7,916,237 B2 | | 3/2011 | Jung et al. |
| 2002/0021383 A1 | | 2/2002 | Kim |
| 2003/0128307 A1 | | 7/2003 | Ito et al. |
| 2004/0014452 A1 | | 1/2004 | Lim et al. |
| 2005/0243573 A1 | | 11/2005 | Kim et al. |
| 2006/0023139 A1 | | 2/2006 | Chen |

(Continued)

FOREIGN PATENT DOCUMENTS

| | | |
|---|---|---|
| CN | 1734325 A | 2/2006 |
| CN | 1779527 A | 5/2006 |

(Continued)

*Primary Examiner* — Paul Lee
(74) *Attorney, Agent, or Firm* — Birch, Stewart, Kolasch & Birch, LLP

(57) ABSTRACT

A backlight unit is disclosed. The backlight unit includes a light emitting device to emit light, an optical member to guide the light emitted from the light emitting device, a bottom chassis disposed on a rear surface of the optical member so as to support the optical member, a supporting member coming into partial contact with the bottom chassis so as to support a module including the light emitting device and a shock-absorbing member disposed between the rear surface of the optical member and the bottom chassis.

18 Claims, 4 Drawing Sheets

(56) References Cited

U.S. PATENT DOCUMENTS

| | | |
|---|---|---|
| 2006/0066769 A1 | 3/2006 | Minaguchi et al. |
| 2006/0066772 A1* | 3/2006 | Takahashi ......... G02F 1/133308 349/60 |
| 2007/0046853 A1 | 3/2007 | Kwon et al. |
| 2007/0206531 A1 | 9/2007 | Pajukoski et al. |
| 2007/0291719 A1 | 12/2007 | Demirhan et al. |
| 2008/0074579 A1 | 3/2008 | Yu |
| 2009/0073342 A1 | 3/2009 | Jung et al. |
| 2009/0207588 A1 | 8/2009 | Sohn |
| 2009/0244437 A1 | 10/2009 | Yamaguchi et al. |
| 2010/0085502 A1* | 4/2010 | Yen ................... G02F 1/133615 349/58 |
| 2010/0134722 A1 | 6/2010 | Huang et al. |

FOREIGN PATENT DOCUMENTS

| | | |
|---|---|---|
| EP | 1633176 A1 | 3/2006 |
| JP | 05-181133 A | 7/1993 |
| JP | 2000-294021 A | 10/2000 |
| JP | 2001-210127 A | 8/2001 |
| JP | 2004-119124 A | 4/2004 |
| JP | 2006-330599 A | 12/2006 |
| JP | 2009-069792 A | 4/2009 |
| JP | 2009-199799 A | 9/2009 |
| JP | 2009-245883 A | 10/2009 |
| KR | 10-2000-0050379 A | 8/2000 |
| KR | 10-2006-0044016 A | 5/2006 |
| KR | 10-2006-0085369 A | 7/2006 |
| KR | 10-2009-0080069 A | 6/2009 |
| TW | I285390 B | 8/2007 |
| WO | WO 2009/008617 A2 | 1/2009 |

* cited by examiner

【Fig. 1】
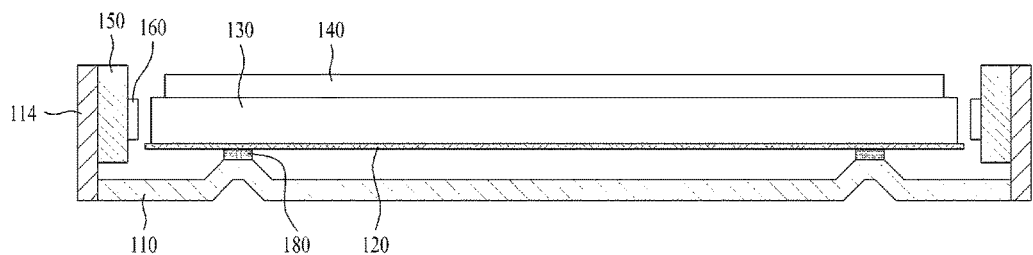
【Fig. 2】
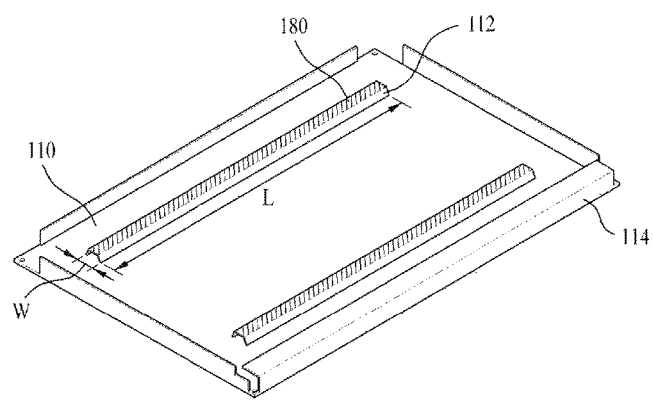
【Fig. 3】
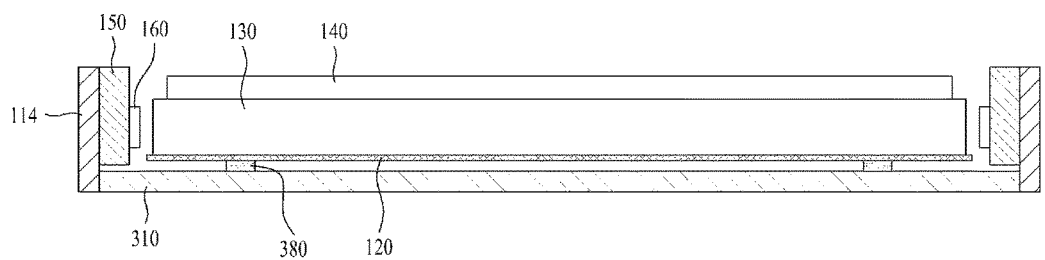

[Fig. 4]
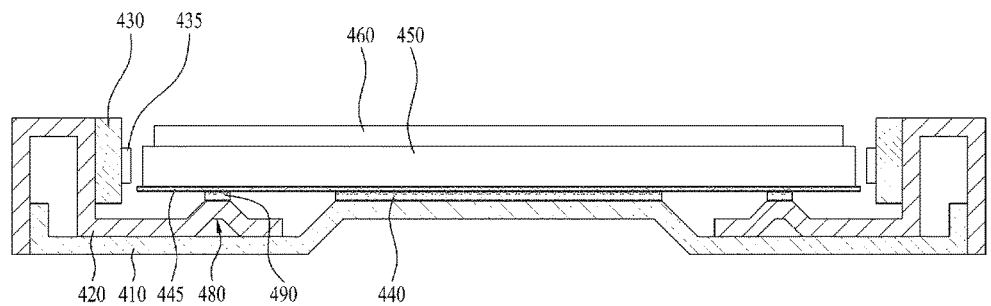
[Fig. 5]
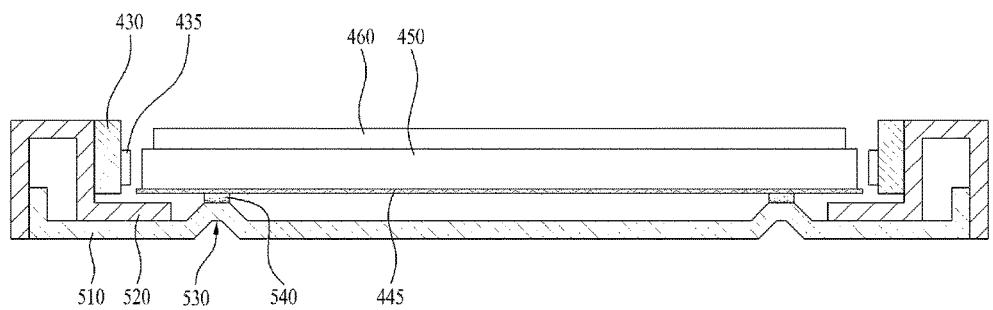
[Fig. 6]
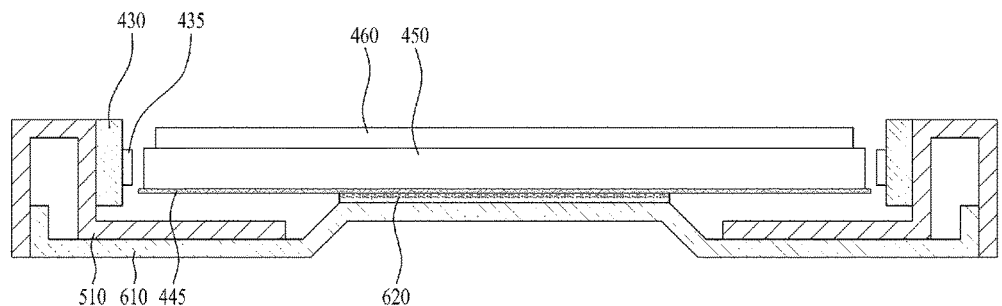

[Fig. 7]
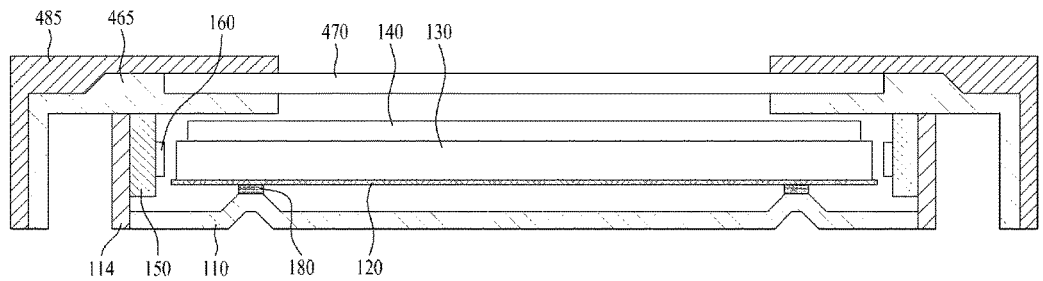
[Fig. 8]
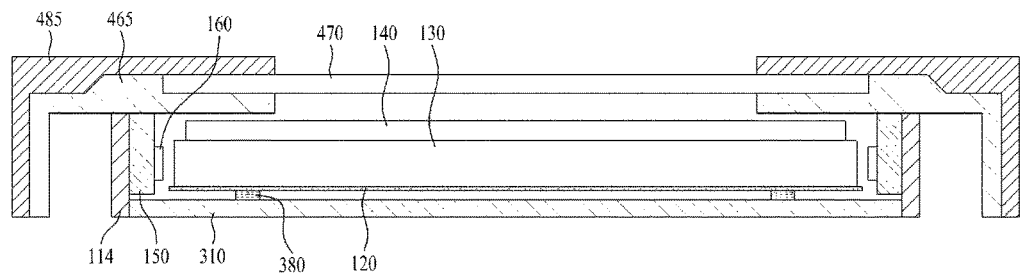
[Fig. 9]
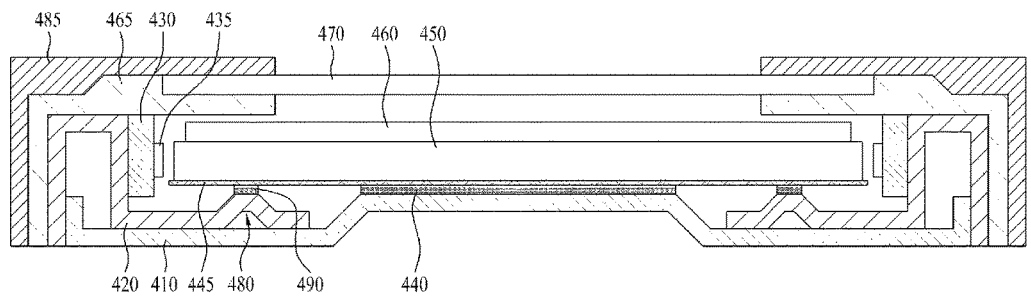

[Fig. 10]
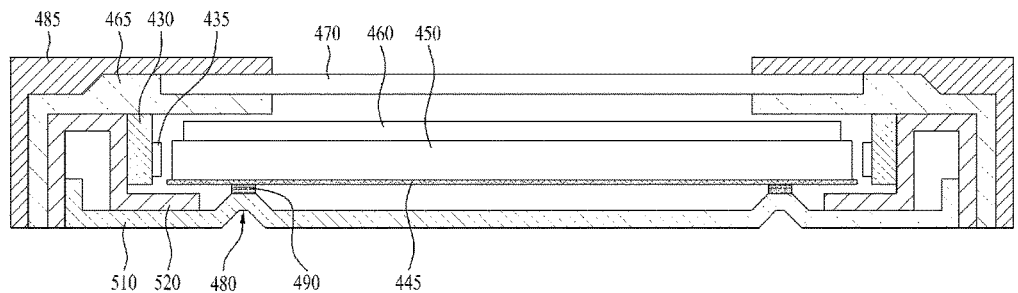
[Fig. 11]
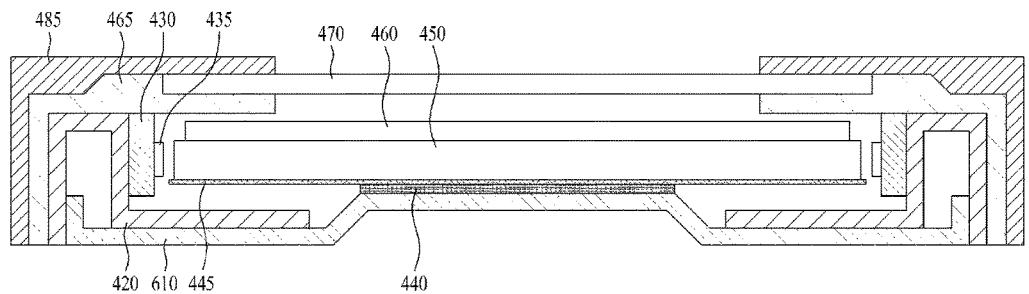

ID: 9,739,933 B2

BACKLIGHT UNIT COMPRISING FIRST AND SECOND SHOCK-ABSORBING MEMBERS

This application is a Divisional of copending application Ser. No. 13/114,800, filed on May 24, 2011, which claims priority under 35 U.S.C. §119(a) to Korean Patent Application No. 10-2010-0048498, filed in Korea on May 25, 2010, all of which are hereby expressly incorporated by reference into the present application.

BACKGROUND

The embodiment relates to a backlight unit and a display device.

Generally, Liquid Crystal Displays (LCDs) have higher visibility than Cathode Ray Tubes (CRTs) and less average power consumption and heat emission than the same screen size of CRTs. For this reason, LCDs have been widely used in mobile phones, computer monitors and televisions, along with plasma display devices or field emission display devices.

The driving principle of LCDs is based on optical isotropy and polarization of liquid crystals. Elongated liquid crystals exhibit directivity in molecular arrangement. Here, the molecular arrangement direction of liquid crystals may be controlled by applying an electric field to liquid crystals.

Accordingly, controlling the molecular arrangement direction of liquid crystals may change molecular arrangement of liquid crystals, whereby image information can be displayed as light is refracted in the molecular arrangement direction of liquid crystals by optical isotropy.

However, LCDs are non-self emissive devices and require a separate light source. One example of the light source is a backlight unit. Specifically, light emitted from a backlight unit disposed behind a liquid crystal panel is introduced into the liquid crystal panel, such that transmittance of light is controlled based on the arrangement of liquid crystals, enabling display of an image.

SUMMARY

Accordingly, the embodiment is directed to a backlight unit and a display device that substantially obviate one or more problems due to limitations and disadvantages of the related art.

An object of the embodiment is to provide a backlight unit and a display device capable of preventing damage due to movement of a light guide plate.

Additional advantages, objects, and features of the embodiment will be set forth in part in the description which follows and in part will become apparent to those having ordinary skill in the art upon examination of the following or may be learned from practice of the embodiment. The objectives and other advantages of the embodiment may be realized and attained by the structure particularly pointed out in the written description and claims hereof as well as the appended drawings.

To achieve these objects and other advantages and in accordance with the purpose of the embodiment, as embodied and broadly described herein, a backlight unit includes a light emitting device to emit light, an optical member to guide the light emitted from the light emitting device, a bottom chassis disposed on a rear surface of the optical member so as to support the optical member, a supporting member coming into partial contact with the bottom chassis so as to support a module including the light emitting device and a shock-absorbing member disposed between the rear surface of the optical member and the bottom chassis.

The optical member may include a light guide plate.

The optical member may further include a reflective sheet disposed between the shock-absorbing member and the light guide plate so as to reintroduce the light exiting a rear surface of the light guide plate into the light guide plate.

The shock-absorbing member may come into direct contact with at least one of the rear surface of the optical member and the bottom chassis.

The shock-absorbing member may be disposed in a region of the optical member.

The shock-absorbing member may take the form of a line.

The shock-absorbing member may have the form of two lines facing each other.

The bottom chassis may include at least one first protrusion protruding toward the light guide plate, and the shock-absorbing member may come into contact with a surface of the at least one first protrusion.

The shock-absorbing member may be an insulating tape.

The supporting member may be a bracket including a vertical portion perpendicular to the bottom chassis and a horizontal portion connected to the vertical portion so as to be parallel to the bottom chassis.

The shock-absorbing member may be disposed between the horizontal portion of the bracket and the optical member.

The supporting member may further include a guide panel.

The horizontal portion of the bracket may include at least one second protrusion protruding toward the optical member, and the shock-absorbing member may come into contact with a surface of the at least one second protrusion.

The bottom chassis may include at least one first protrusion protruding toward the optical member, and the backlight unit may further include a second shock-absorbing member provided between the at least one first protrusion and the optical member.

In accordance with another aspect of the embodiment, a display device includes a liquid crystal panel and a backlight unit to irradiate light to the liquid crystal panel, wherein the backlight unit includes a light emitting device to emit light, an optical member to guide the light emitted from the light emitting device, a bottom chassis disposed on a rear surface of the optical member so as to support the optical member, a supporting member coming into partial contact with the bottom chassis so as to support a module including the light emitting device and a shock-absorbing member disposed between the rear surface of the optical member and the bottom chassis.

It is to be understood that both the foregoing general description and the following detailed description of the embodiment are exemplary and explanatory and are intended to provide further explanation of the embodiment as claimed.

BRIEF DESCRIPTION OF THE DRAWINGS

The accompanying drawings, which are included to provide a further understanding of the embodiment and are incorporated in and constitute a part of this application, illustrate embodiment(s) and together with the description serve to explain the principle of the embodiment. In the drawings:

FIG. 1 is a sectional view illustrating a backlight unit according to one embodiment;

FIG. 2 is a perspective view illustrating a shock-absorbing member in contact with a bottom chassis illustrated in FIG. 1;

FIG. 3 is a sectional view of a backlight unit according to another embodiment;

FIG. 4 is a sectional view of a backlight unit according to another embodiment;

FIG. 5 is a sectional view of a backlight unit according to another embodiment;

FIG. 6 is a sectional view of a backlight unit according to another embodiment; and FIGS. 7 to 11 are sectional views illustrating display devices according to other embodiments.

DETAILED DESCRIPTION OF THE EMBODIMENTS

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, a light emitting device and a method of manufacturing the same according to the embodiment will be described with reference to accompanying drawings.

FIG. 1 is a sectional view illustrating a backlight unit according to one embodiment. The backlight unit includes a bottom chassis 110, a reflective sheet 120, a light guide plate 130, an optical sheet 140, a printed circuit board 150, Light Emitting Diode packages 160 and a shock-absorbing member 180. Here, the light guide plate 130 and the optical sheet 140 may be referred to optical members.

The bottom chassis 110 is configured to receive the reflective sheet 120, the light guide plate 130, the optical sheet 140, the printed circuit board 150 and the LED packages 160. The bottom chassis 110 is made of a metal, such as aluminum, zinc, copper, iron, stainless steel and alloys thereof.

The LED packages 160 are mounted on one surface of the printed circuit board 150 and serve to emit light. In this case, the LED packages 160 mounted on the printed circuit board 150 are referred to an LED package module.

The other surface of the printed circuit board 150 is fixed to a guide panel 114 defining a sidewall of the bottom chassis 110. The light guide plate 130 is disposed within the bottom chassis 110 such that a light incident surface of the light guide plate 130 faces the LED packages 160, thereby serving to receive the light emitted from the LED packages 160 and guide the light in a given direction.

The reflective sheet 120 is disposed between the bottom chassis 110 and the light guide plate 130 and functions to reflect the light exiting a rear surface of the light guide plate 130 so as to reintroduce the light into the light guide plate 130. The optical sheet 140 is disposed above the light guide plate 130 and serves to improve properties of the light having passed therethrough.

The bottom chassis 110 is provided with at least one second protrusion 112 to support the reflective sheet 120 and the light guide plate 130. In addition, the at least one second protrusion 112 serves to position the light guide plate 130 such that the light incident surface of the light guide plate 130 faces the LED packages 160. For example, the second protrusion 112 may take the form of a line extending in a direction perpendicular to the light incident surface of the light guide plate 130 and may include two or more second protrusions spaced apart from each other.

One surface of the shock-absorbing member 180 contacts with a surface of the second protrusion 112 and the other surface of the shock-absorbing member 180 contacts with the reflective sheet 120. The shock-absorbing member 180 is disposed in a region of the optical member. Specifically, the shock-absorbing member 180 may come into direct contact with the optical member, or may spatially correspond to the optical member.

The shock-absorbing member 180 may be made of various materials. For example, the shock-absorbing member 180 may take the form of an insulating tape and may be made of rubber, silicone or the like.

The shock-absorbing member 180 may prevent damage to the reflective sheet 120 in contact therewith and the light guide plate 130 disposed on the reflective sheet 120 due to shock or heat transferred from the bottom chassis 110.

In addition, the shock-absorbing member 180 may exhibit frictional force to prevent unwanted movement of the reflective sheet 120 in contact therewith and/or the light guide plate 130 disposed on the reflective sheet 120.

The light guide plate 130 is disposed such that the light incident surface thereof is close to the LED packages 160. If the light guide plate 130 is moved, the light incident surface of the light guide plate 130 may be damaged due to collision with the LED packages 160 and color uniformity of the backlight unit may be deteriorated.

FIG. 2 is a view illustrating the shock-absorbing member 180 in contact with the bottom chassis 110 illustrated in FIG. 1. Referring to FIG. 2, the shock-absorbing member 180 is formed at a surface of the line-shaped second protrusion 112 and thus, may have a line form. In this case, the second protrusion 112 formed at the bottom chassis 110 may take the form of a line having a predetermined length L and width W, which extends in a direction parallel to the light incident surface of the light guide plate 130, and the shock-absorbing member 180 contacts with an upper surface of the second protrusion 112. Although FIG. 2 illustrates the second protrusion 112 and the shock-absorbing member 180 formed on the bottom chassis 110 as respectively taking the form of two lines, the number and shape thereof are not limited thereto.

FIG. 3 is a sectional view of a backlight unit according to another embodiment. Referring to FIG. 3, the backlight unit includes a bottom chassis 310, the reflective sheet 120, the light guide plate 130, the optical sheet 140, the printed circuit board 150, the LED packages 160 and a shock-absorbing member 380.

Differently from FIG. 1, the bottom chassis 310 illustrated in FIG. 3 has a flat inner surface without the second protrusion. One surface of the shock-absorbing member 380 contacts with the flat surface of the bottom chassis 310 and the other surface of the shock-absorbing member 380 contacts with the reflective sheet 120. The reflective sheet 120, the light guide plate 130, the optical sheet 140, the printed circuit board 150 and the LED packages 160 are identical to those as described in relation to FIG. 1 and thus, a description thereof will be omitted to avoid repetition.

FIG. 4 is a sectional view of a backlight unit according to another embodiment. Referring to FIG. 4, the backlight unit includes a bottom chassis 410, a bracket 420, a printed circuit board 430, LED packages 435, a shock-absorbing member 440 (hereinafter, referred to a first shock-absorbing member that is distinguished from a second shock-absorbing member), a reflective sheet 445, a light guide plate 450, an optical sheet 460 and a second shock-absorbing member 490.

The bottom chassis 410 is configured to receive constituent elements of the backlight unit. The reflective sheet 445, the light guide plate 450 and the optical sheet 460 are sequentially received within the bottom chassis 410. The bottom chassis 410 serves to support the reflective sheet 445 and the light guide plate 450.

The bottom chassis 410 includes an outer portion surrounding the bracket 420 and a rear surface portion having a first protrusion protruding toward the reflective sheet 445 and the light guide plate 450. The first protrusion serves to support the reflective sheet 445.

The first shock-absorbing member 440 contacts with a surface of the first protrusion of the bottom chassis 410. Specifically, the first shock-absorbing member 440 is disposed between the first protrusion of the bottom chassis 410 and the reflective sheet 445 and the reflective sheet 445 comes into close contact with the first shock-absorbing member 440.

The first shock-absorbing member 440 may come into contact with a front surface or a partial region of the protrusion of the bottom chassis 410. Also, the first shock-absorbing member 440 may include a single line-shaped shock-absorbing member, or a plurality of line-shaped shock-absorbing members spaced apart from one another so as to come into contact with the surface of the first protrusion.

The LED packages 435 are mounted on one surface of the printed circuit board 430 and emit light to a light incident surface of the light guide plate 450. The other surface of the printed circuit board 430 is fixed to the corresponding bracket 420.

The light guide plate 450 is disposed within the bottom chassis 410 and serves to receive the light emitted from the LED packages 160 and guide the light in a given direction. Specifically, the light guide plate 450 converts linear light emitted from the LED packages 435 to planar light so as to transmit uniform light to a screen display region (for example, a liquid crystal panel). The light guide plate 450 is typically made of transparent acryl and has a thickness of about several millimeters. A lower surface of the light guide plate 450 may be provided with a plurality of dots or V-shaped holes (not shown) for uniform light reflection.

The reflective sheet 445 is disposed between the bottom chassis 410 and the light guide plate 450 and reflects the light exiting a rear surface of the light guide plate 450 so as to reintroduce the light into the light guide plate 450.

The bracket 420, to which the printed circuit board 430 provided with the LED packages 435 is fixed, is disposed adjacent to one side surface (i.e. the light incident surface) of the light guide plate 450 and functions to dissipate heat from the LED packages 435 and the printed circuit board 430.

Here, both the bracket 420 and the guide panel 114 of the above described embodiment can function to support the LED package module including light emitting devices while coming into contact with the bottom chassis 410 and thus, may be referred to supporting members.

The bracket 420 includes a vertical portion and a horizontal portion connected thereto. The vertical portion has at least one bent portion.

The printed circuit board 430 is fixed to the vertical portion of the bracket 420 and the horizontal portion of the bracket 420 is disposed between edge regions of the reflective sheet 445 and the bottom chassis 410. In this case, the edge regions mean regions adjacent to an edge region of the light guide plate 450.

The bracket 420 may have various shapes. For example, the bracket 420 may have an "L"-shaped form. Alternatively, as illustrated in FIG. 4, the vertical portion of the bracket 420 may have an inverted "U"-shaped form.

The bracket 420 is provided at a surface of the horizontal portion thereof with a second protrusion 480 that serves to support the reflective sheet 445 and the light guide plate 450 disposed on the reflective sheet 445. Although FIG. 4 illustrates only one second protrusion 480, the embodiment is not limited thereto.

The second protrusion 480 may take the form of a line having a predetermined length and width, which extends in a direction parallel to the light incident surface of the light guide plate 130. The second shock-absorbing member 490 contacts with an upper surface of the second protrusion 480. Specifically, the second shock-absorbing member 490 is disposed between the second protrusion 480 and the reflective sheet 445 and the reflective sheet 445 comes into close contact with the second shock-absorbing member 490.

Although FIG. 4 illustrates the backlight unit including both the first shock-absorbing member 440 and the second shock-absorbing member 490, the embodiment is not limited thereto, and any one of the first shock-absorbing member 440 and the second shock-absorbing member 490 may be omitted.

The first shock-absorbing member 440 and the second shock-absorbing member 490 may be made of rubber, silicone or the like. The first shock-absorbing member 440 and the second shock-absorbing member 490 may take the form of a double-sided adhesive tape.

In addition to supporting the reflective sheet 445 and the light guide plate 450, the first shock-absorbing member 440 and the second shock-absorbing member 490 may serve to control thicknesses of the reflective sheet 445 and the light guide plate 450, thereby positioning the light guide plate 450 such that the light incident surface of the light guide plate 450 is parallel to the LED packages 435.

The first shock-absorbing member 440 and the second shock-absorbing member 490 may prevent the reflective sheet 445 and the light guide plate 450 from being damaged by shock or heat transferred from the bottom chassis 410. The first shock-absorbing member 440 and the second shock-absorbing member 490 may also prevent unwanted movement of the reflective sheet 445 in contact therewith and the light guide plate 450 disposed on the reflective sheet 445.

The optical sheet 460 is disposed on the light guide plate 450. The optical sheet 460 may include a diffusion sheet to diffuse light directed from the light guide plate 450 and a prismatic sheet to vertically emit light directed from the diffusion sheet. Two or three diffusion and prismatic sheets may be appropriately combined with one another.

The optical sheet 460 may further include a protective sheet disposed on the diffusion sheet or the prismatic sheet. The protective sheet serves to protect the diffusion sheet and the prismatic sheet that are sensitive to dust or scratches and to prevent movement of the diffusion sheet and the prismatic sheet during transportation of the backlight unit.

FIG. 5 is a sectional view of a backlight unit according to another embodiment. Referring to FIG. 5, the backlight unit includes a bottom chassis 510, a bracket 520, the printed circuit board 430, the LED packages 435, the reflective sheet 445, the light guide plate 450, the optical sheet 460 and shock-absorbing member 540.

Differently from FIG. 4, the bracket 520 illustrated in FIG. 5 has no second protrusion at a surface of a horizontal portion thereof, the bottom chassis 510 is provided with at least one first protrusion 530. In the present embodiment, the first protrusion 530 is formed at an edge region thereof adjacent to the edge region of the light guide plate 450, rather than being provided at the center of the bottom chassis 510. The shock-absorbing member 540 is formed at a surface of the first protrusion.

FIG. 6 is a sectional view of a backlight unit according to another embodiment. Referring to FIG. 6, a bottom chassis 610 is provided with a first protrusion protruding toward the reflective sheet 445 and the light guide plate 450 and differently from FIG. 5, the first protrusion is formed at the center of a rear surface portion of the bottom chassis 610 rather than being formed at an edge region of the rear surface portion. A shock-absorbing member 620 is formed at a surface of the first protrusion.

FIGS. 7 to 11 are sectional views illustrating display devices according to other embodiments. FIG. 7 illustrates a display device including the backlight unit illustrated in FIG. 1, FIG. 8 illustrates a display device including the backlight unit illustrated in FIG. 3, FIG. 9 illustrates a display device including the backlight unit illustrated in FIG. 4, FIG. 10 illustrates a display device including the backlight unit illustrated in FIG. 5, and FIG. 11 illustrates a display device including the backlight unit illustrated in FIG. 6.

Referring to FIGS. 7 to 11, the display device according to the embodiment of the embodiment includes the backlight unit, a mold frame 465, a liquid crystal panel 470 and a top chassis 485. In this case, the backlight unit is any one of those illustrated in FIGS. 1, 3, and 4 to 6.

The mold frame 465 is disposed to surround a sidewall of the bottom chassis 410 and an edge region of the optical sheet 460. The liquid crystal panel 470 is seated on an upper end of the mold frame 465 so as to be disposed on an upper surface (or a front surface) of the optical sheet 460. The liquid crystal panel 470 is configured such that liquid crystals are filled between glass substrates and polarizing plates are disposed respectively on both the glass substrates to polarize light. Here, the liquid crystals are regularly arranged organic molecules having properties between solid and liquid and thus, having fluidity. The molecular arrangement of liquid crystals is changed by an exterior electric field, enabling display of an image. A color filter (not shown) may be provided on a front surface of the liquid crystal panel 470.

The top chassis 485 is disposed to surround the mold frame 465 and an edge region of the liquid crystal panel 470. The mold frame 465 and the top chassis 485 respectively have central openings to expose a display region of the liquid crystal panel 470.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device comprising:
a bottom chassis;
a bracket including a vertical portion perpendicular to the bottom chassis and a horizontal portion connected to the vertical portion;
a light emitting device on the vertical portion of the bracket;
an optical member to guide the light emitted from the light emitting device;
a first shock-absorbing member disposed between the bottom chassis and the optical member;
a second shock-absorbing member disposed between the bracket and the optical member;
at least one first protrusion formed on a first side of the bottom chassis and supporting the optical member; and
at least one second protrusion formed on a first side of a horizontal portion of the bracket and supporting the optical member,
wherein the first shock-absorbing member and the second shock-absorbing member are separated.

2. The lighting device according to claim 1, wherein the at least one first protrusion is formed toward the light guide plate.

3. The lighting device according to claim 1, further comprising at least one first recess formed on a second side of the bottom chassis.

4. The lighting device according to claim 1, wherein the first shock-absorbing member is disposed on the at least one first protrusion.

5. The lighting device according to claim 1, wherein the second shock-absorbing member is disposed between the horizontal portion of the bracket and the optical member.

6. The lighting device according to claim 1, wherein the at least one second protrusion is formed toward the light guide plate.

7. The lighting device according to claim 1, further comprising at least one second recess formed on a second side of a horizontal portion of the bracket.

8. The lighting device according to claim 1, wherein the second shock-absorbing member is disposed on the at least one second protrusion.

9. The lighting device according to claim 1, wherein the optical member includes a light guide plate and a reflective sheet.

10. The lighting device according to claim 9, wherein the reflective sheet directly contacts to at least one of the first shock-absorbing member or the second shock-absorbing member.

11. The lighting device according to claim 1, wherein at least two second shock-absorbing members are disposed between the bracket and the optical member, and
wherein the first shock-absorbing member is disposed between the second shock-absorbing members.

12. The lighting device according to claim 1, wherein a width of the first shock-absorbing member is longer than that of the second shock-absorbing member.

13. The lighting device according to claim 1, wherein the bracket includes two horizontal portions and two vertical portions.

14. The lighting device according to claim 13, wherein one of the horizontal portions of the bracket is disposed under the optical member.

15. The lighting device according to claim 13, wherein one of the horizontal portions and two vertical portion of the bracket are disposed on a side of the optical member.

16. The lighting device according to claim 1, wherein the at least one second protrusion has a form of a line.

17. A lighting device comprising:
a bottom chassis;
a bracket including a vertical portion perpendicular to the bottom chassis and a horizontal portion connected to the vertical portion;
a light emitting device on the vertical portion of the bracket;
an optical member to guide the light emitted from the light emitting device;
a first shock-absorbing member disposed between the bottom chassis and the optical member;
a second shock-absorbing member disposed between the bracket and the optical member;
at least one first protrusion formed on a first side of the bottom chassis and supporting the optical member; and
at least one second protrusion formed on a first side of a horizontal portion of the bracket and supporting the optical member,
wherein the at least one second protrusion is between the bracket and the optical member.

18. A lighting device comprising:
a bottom chassis;
a bracket including a vertical portion perpendicular to the bottom chassis and a horizontal portion connected to the vertical portion;
a light emitting device on the vertical portion of the bracket;
an optical member to guide the light emitted from the light emitting device;
a first shock-absorbing member disposed between the bottom chassis and the optical member;
a second shock-absorbing member disposed between the bracket and the optical member;
at least one first protrusion formed on a first side of the bottom chassis and supporting the optical member; and
at least one second protrusion formed on a first side of a horizontal portion of the bracket and supporting the optical member,
wherein the at least one second protrusion extends upwardly from the bracket.

* * * * *